United States Patent
Kigoshi

(10) Patent No.: US 8,134,312 B2
(45) Date of Patent: Mar. 13, 2012

(54) MOTOR CONTROL CIRCUIT AND POWER WINDOW DEVICE

(75) Inventor: Katsunori Kigoshi, Kasugai (JP)

(73) Assignee: OMRON Corporation, Kyoto (JP)

( * ) Notice: Subject to any disclaimer, the term of this patent is extended or adjusted under 35 U.S.C. 154(b) by 379 days.

(21) Appl. No.: 12/573,683

(22) Filed: Oct. 5, 2009

(65) Prior Publication Data

US 2010/0083579 A1    Apr. 8, 2010

(30) Foreign Application Priority Data

Oct. 6, 2008   (JP) .................................. 2008-259872

(51) Int. Cl.
  *H02P 1/00*      (2006.01)
  *H02P 1/04*      (2006.01)
  *H02G 3/00*      (2006.01)
  *B23K 11/24*     (2006.01)

(52) U.S. Cl. ........ 318/280; 318/101; 318/283; 318/286; 318/293; 318/466; 318/468; 318/483; 307/9.1; 307/10.1; 307/112

(58) Field of Classification Search .................. 318/101, 318/280, 283, 286, 293, 466, 468, 483; 307/9.1, 307/10.1, 112
See application file for complete search history.

(56) References Cited

U.S. PATENT DOCUMENTS

| | | | | |
|---|---|---|---|---|
| 6,201,363 B1 * | 3/2001 | Miyazawa | .................... | 318/283 |
| 6,396,227 B2 * | 5/2002 | Sasaki | .......................... | 318/283 |
| 6,690,096 B2 * | 2/2004 | Sasaki | .......................... | 307/10.1 |
| 7,250,737 B2 * | 7/2007 | Takahashi | .................... | 318/434 |
| 2004/0160202 A1 * | 8/2004 | Sugiura et al. | ................ | 318/101 |

FOREIGN PATENT DOCUMENTS

| | | |
|---|---|---|
| JP | 2007-224637 A | 9/2007 |
| JP | 2008-106560 A | 5/2008 |
| WO | 00/37761 A1 | 6/2000 |

\* cited by examiner

*Primary Examiner* — Walter Benson
*Assistant Examiner* — Gabriel Agared
(74) *Attorney, Agent, or Firm* — Osha Liang LLP

(57) ABSTRACT

A motor control circuit includes a manipulation unit, a control unit that drives a motor in a normal rotation direction or a reverse rotation direction, a catch detecting unit that detects a foreign substance caught in the opening and closing body, a first relay circuit that connects one of terminals of the motor to a power supply when the motor is driven in the normal rotation direction, a second relay circuit that connects the other terminal of the motor to the power supply when the motor is driven in the reverse rotation direction, a switch element that cuts off connection to the power supply when the normal rotation command is fed into the control unit from the manipulation unit, a detection circuit, and a feed circuit.

10 Claims, 15 Drawing Sheets

NO WATER LEAKAGE, NO CHATTER, AND AUTOMATIC CLOSING MANIPULATION

NO WATER LEAKAGE, NO CHATTER, AND AUTOMATIC OPENING MANIPULATION

NO WATER LEAKAGE, CHATTER, AND AUTOMATIC CLOSING MANIPULATION

NO WATER LEAKAGE, CHATTER, AND AUTOMATIC OPENING MANIPULATION

WATER LEAKAGE, NO CHATTER, AND AUTOMATIC CLOSING MANIPULATION

WATER LEAKAGE, NO CHATTER, AND AUTOMATIC OPENING MANIPULATION

WATER LEAKAGE, CHATTER, AND AUTOMATIC CLOSING MANIPULATION

WATER LEAKAGE, CHATTER, AND AUTOMATIC OPENING MANIPULATION

MOTOR CONTROL CIRCUIT AND POWER WINDOW DEVICE

BACKGROUND OF THE INVENTION

1. Technical Field

The present invention relates to a motor control circuit and a power window device provided therewith.

2. Related Art

Conventionally, there are well known various power window devices including a window, a motor that opens and closes the window, and a motor control circuit that controls the motor (for example, see Japanese Unexamined Patent Publication Nos. 2007-224637 and 2008-106560). In such power window devices, a window opening operation is performed by a normal rotation of the motor, and a window closing operation is performed by a reverse rotation of the motor.

In the power window device disclosed in Japanese Unexamined Patent Publication No. 2007-224637, a manipulation knob is provided so as to be switched to positions of "automatic closing AC", "manual closing MC", "neutral N", "manual opening MO", and "automatic opening AO". In the power window device, once the manipulation knob is switched to the position of "automatic closing AC", the window closing operation is continuously performed even if the manipulation knob is returned to the position of "neutral N". The power window device stops the window closing operation when detecting that a foreign substance is caught in the window during the window closing operation. The detection that foreign substance is caught in the window is determined based on a rotating speed of the motor.

In the power window device disclosed in Japanese Unexamined Patent Publication No. 2008-106560, the window opening and closing operations can be performed even if a vehicle is submerged. Therefore, the window opening operation can be performed even if the vehicle equipped with the power window device is submerged in a sea or a river, so that a driver can be prevented from being locked in the vehicle.

A catch preventing function and a function of performing the window opening operation in the submerged state, as described above are demanded for the power window device. There has been proposed a power window device having the functions (for example, see WO 00/37761).

The power window device disclosed in WO 00/37761 includes a first relay circuit that normally rotates the motor and a second relay circuit that reversely rotates the motor. The first relay circuit includes a first coil through which a current is passed when a manipulation switch is turned on to open the window and a first relay contact that connects the motor to a power supply when the current is passed through the first coil. The second relay circuit includes a second coil through which a current is passed when a manipulation switch is turned on to close the window and a second relay contact that connects the motor to the power supply when the current is passed through the second coil.

In the power window device disclosed in WO 00/37761, a switch element is provided to short-circuit both ends of the second coil when the manipulation switch is turned on to open the window. The switch element is interlocked with the manipulation switch that is used to open the window. The power window device is submerged, and the manipulation switch used to close the window is short-circuited to pass the current through the second coil. Even in such cases, when the manipulation switch used to open the window is turned on, the switch element short-circuits both the ends of the second coil, so that the current can be passed only through the first coil. Accordingly, in the power window device disclosed in WO 00/37761, the window opening operation can be performed in the submerged state.

SUMMARY

However, in the power window device disclosed in WO 00/37761, because the switch element is interlocked with the manipulation switch that is turned on and off by the manipulation of the manipulation knob, sometimes the switch element chatters due to a mechanical vibration in manipulating the manipulation knob. For example, while the vehicle is not submerged, the manipulation knob is switched to the position of "automatic closing AC" to close the window, and the driver releases driver's hand from the manipulation knob. In such cases, although the manipulation knob is swiftly returned to the position of "neutral N" by a spring force, the switch element interlocked with the manipulation switch chatters by the vibration of the manipulation knob caused when returning, and sometimes the current passed through the second coil is instantly cut off. Therefore, because the rotation (reverse rotation) of the motor is tentatively stopped, a false determination that the catch is generated is made, and the motor is switched to the normal rotation even if the window closing manipulation is performed, which causes a problem in that the window is opened.

One or more embodiments of the present invention provide a motor control circuit and a power window device, which can prevent the false determination that the catch is generated due to the chatter of the switch element.

In accordance with one aspect of the present invention, a motor control circuit includes: a manipulation unit; a control unit that drives a motor in a normal rotation direction or a reverse rotation direction according to a normal rotation command or a reverse rotation command, the normal rotation command or the reverse rotation command being fed from the manipulation unit, the control unit driving an opening and closing body in a opened direction or a closed direction by driving the motor in the normal rotation direction or the reverse rotation direction; a catch detecting unit that detects that a foreign substance is caught in the opening and closing body when the opening and closing body is driven in the closed direction, the control unit stopping the drive of the motor in the reverse rotation direction by receiving an output from the catch detecting unit when the foreign substance is caught in the opening and closing body; a first relay circuit that connects one of terminals of the motor to a power supply when the motor is driven in the normal rotation direction; a second relay circuit that connects the other terminal of the motor to the power supply when the motor is driven in the reverse rotation direction; a switch element that cuts off connection to the power supply when the normal rotation command is fed into the control unit from the manipulation unit, the power supply actuating the second relay circuit; a detection circuit that prevents the drive of the motor in the reverse rotation direction when detected that a vehicle is submerged; and a feed circuit that puts the power supply and the second relay circuit in a conduction state when the switch element cuts off the connection to the power supply, the power supply actuating the second relay circuit, when the motor is driven in the reverse rotation direction while the detection circuit does not detect that the vehicle is submerged.

Accordingly, the feed circuit supplies the electric power to the second relay circuit even if the switch element chatters while the vehicle is not submerged, so that the motor can continuously be rotated in the reverse rotation direction. Further, the feed circuit does not supply the electric power to the second relay circuit when the vehicle is submerged, so that the situation in which the window is not be opened in the submerged state can be prevented.

The motor control circuit may be configured such that the first relay circuit includes: a first coil through which a current is passed when the motor is driven in the normal rotation direction; and a first relay contact that connects one of the terminals of the motor to the power supply when the current is passed through the first coil, the second relay circuit includes: a second coil through which a current is passed when the motor is driven in the reverse rotation direction; and a second relay contact that connects the other terminal of the motor to the power supply when the current is passed through the second coil, and the switch element short-circuits one end of the second coil to the other end of the second coil when the normal rotation command is fed from the manipulation unit.

In the motor control circuit in which the second relay circuit includes the second coil, the feed circuit may include: a resistor that is connected to the power supply; a diode that is connected between the resistor and one end of the second coil; and a transistor that grounds a connecting point of the resistor and the diode when the detection circuit detects that the vehicle is submerged.

The motor control circuit in which the second relay circuit includes the second coil may be configured to include: a first switching circuit that switches whether the current is passed through the first coil; and a second switching circuit that switches whether the current is passed through the second coil, wherein the first switching circuit and the second switching circuit switch whether the currents are passed through the first coil and the second coil under the control of the control unit when the detection circuit does not detect that the vehicle is submerged, and the detection circuit connects the power supply to the first switching circuit and the second switching circuit, and the first switching circuit and the second switching circuit pass the currents through the first coil and the second coil, when the detection circuit detects that the vehicle is submerged.

In accordance with another aspect of the present invention, a power window device includes: an opening and closing body that is provided in a window; a motor that drives the opening and closing body; a power supply that supplies an electric power to the motor; and any one of the above motor control circuit.

Accordingly, one or more embodiments of the present invention can provide the motor control circuit and power window device to prevent the false determination that the catch is generated due to the chatter of the switch element.

DETAILED DESCRIPTION

Hereinafter, a preferred embodiment of the present invention will be described with reference to the drawings. The case in which the invention is applied to a power window device provided in a vehicle driving seat is described in the following embodiment.

Figure 1:
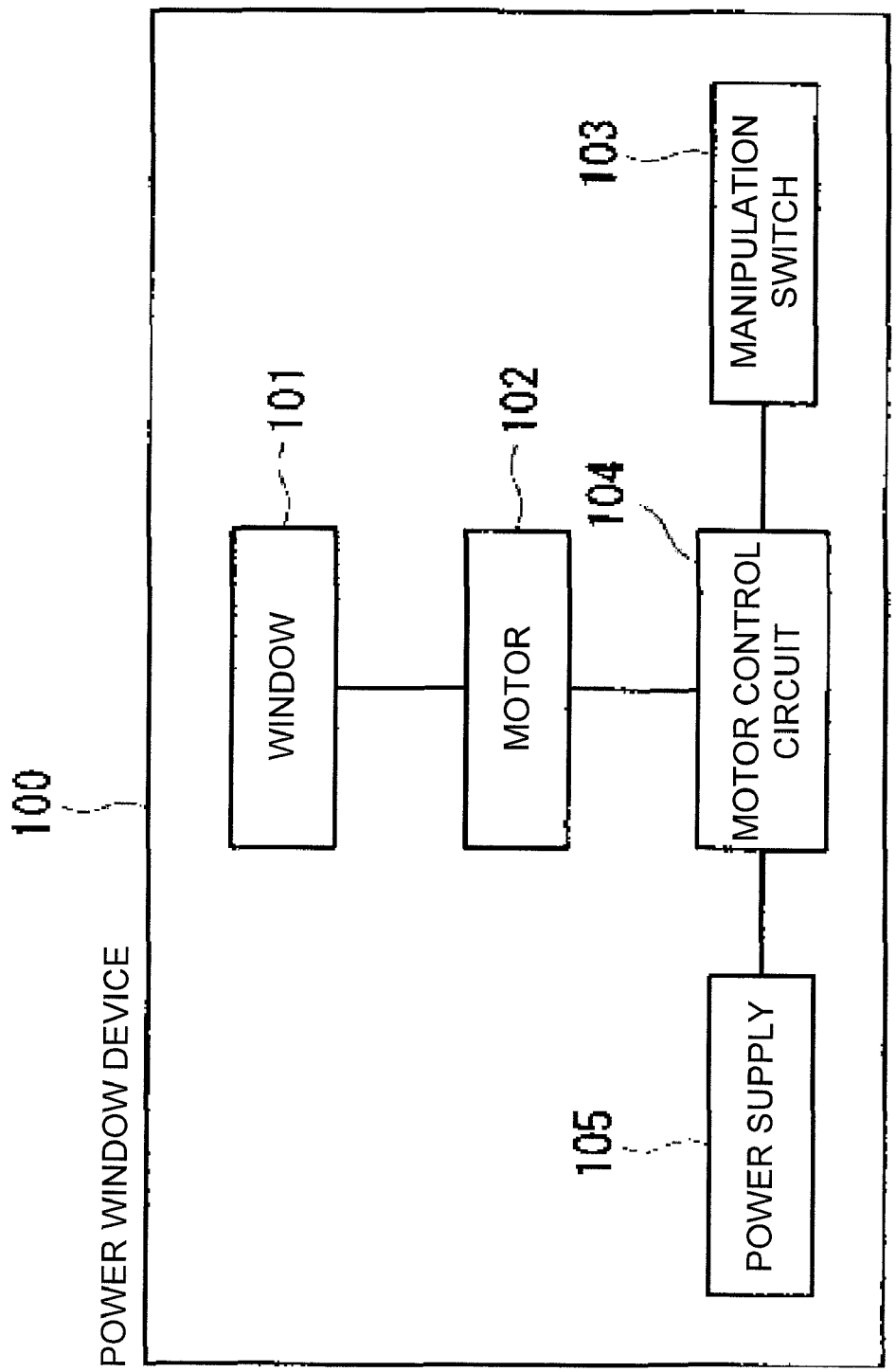
FIG. 1 is a block diagram illustrating a configuration of a power window device according to an embodiment of the invention.

FIG. 1 is a block diagram illustrating a configuration of a power window device according to an embodiment of the invention. Referring to FIG. 1, a power window device 100 of the embodiment includes a driving-seat window 101, a motor 102 that opens and closes the window 101, a manipulation switch 103 that is used when a driver manipulates the window 101, a motor control circuit 104 that controls the motor 102, and a power supply 105 that supplies an electric power to the motor 102.

The motor 102 drives the window 101 in an opened direction when driven in a normal rotation direction, and the motor 102 drives the window 101 in a closed direction when driven in a reverse rotation direction.

Figure 2:
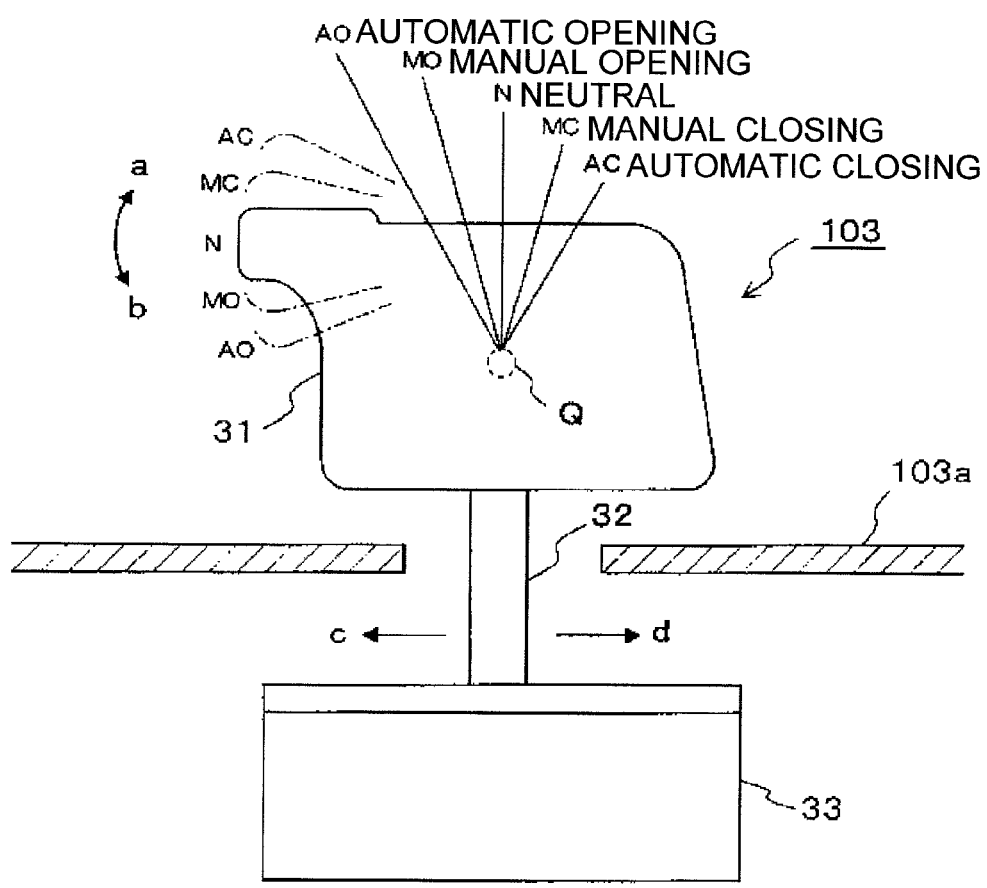
FIG. 2 is a side view schematically illustrating a manipulation switch of FIG. 1.
Figure 3:
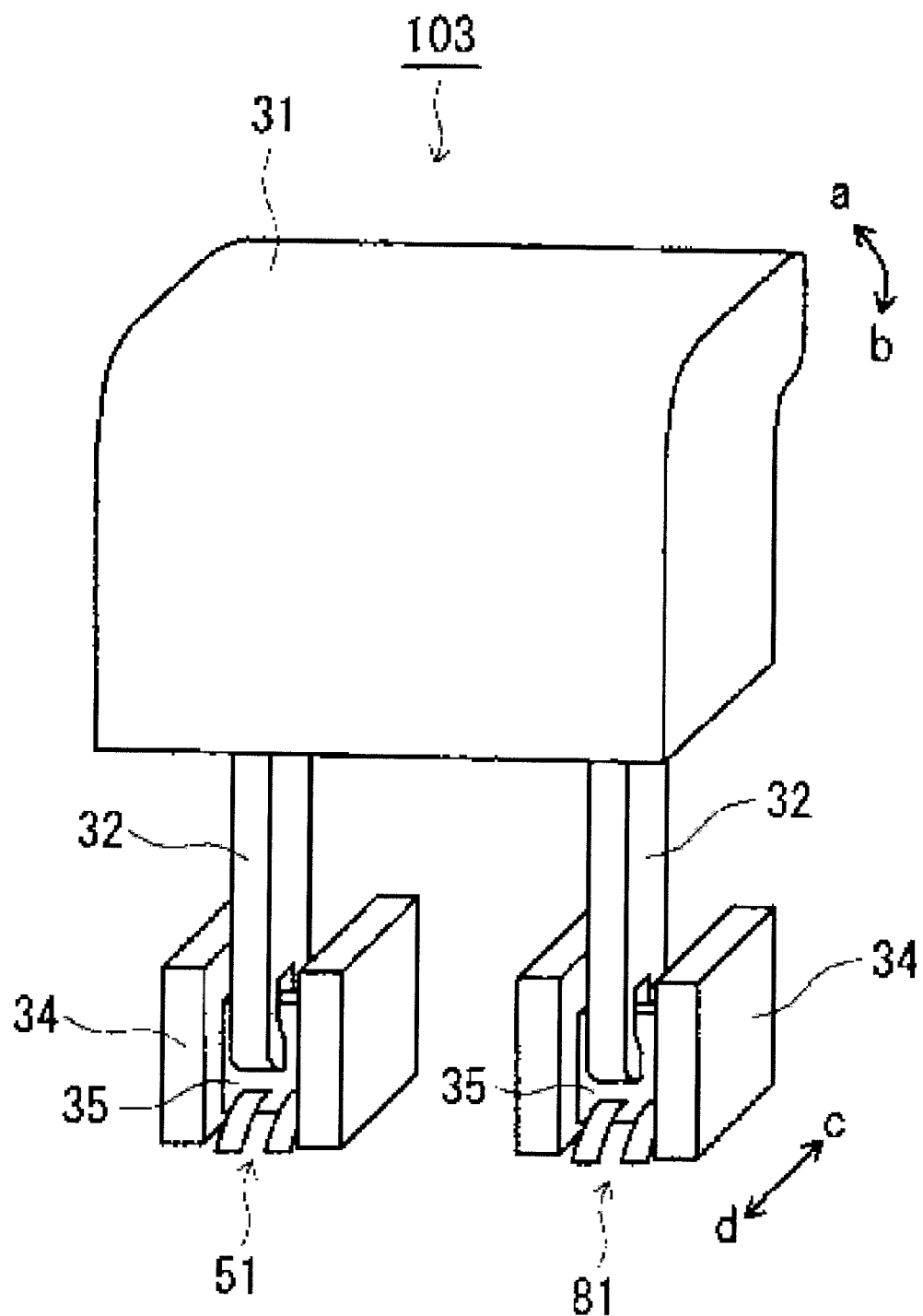
FIG. 3 is a perspective view schematically illustrating the manipulation switch of FIG. 1.

FIGS. 2 and 3 are schematic diagrams illustrating examples of the manipulation switch 103. Referring to FIG. 2, the manipulation switch 103 includes a manipulation knob 31 that is rotatable in an ab-direction about a shaft Q, a rod 32 that is provided while integrated with the manipulation knob 31, and a slide switch 33. The manipulation knob 31 is an example of the "manipulation unit" of the invention. A switch unit in which the manipulation switch 103 is incorporated has a cover 103a. The manipulation switch 103 of FIG. 3 is a manipulation switch that constitutes a switch element group 8 and a switch element 5 in FIG. 6 as described below. A lower end of the rod 32 is engaged with an engagement unit 35 of an actuator 34 that is provided in the slide switch 33. When the manipulation knob 31 is rotated in the ab-direction, the actuator 34 is moved in a cd-direction with the rod 32 interposed therebetween. A movable-side terminal 51 of the switch element 5 and a movable-side terminal 81 of the switch element group 8 are provided in the actuator 34, and the movable-side terminal 51 and the movable-side terminal 81 are interlocked with each other by manipulation of the manipulation knob 31. Although not illustrated, a board is provided below the actuator 34. In the board, fixed-side terminals that come into contact with the movable-side terminals 51 and 81 are formed with a predetermined pattern. The movable-side terminal 51 and 81 come into contact with the predetermined fixed-side terminals according to a movement position of the actuator 34, thereby performing the switching in the switch element 5 and the switch element group 8.

As illustrated in FIG. 2, the manipulation knob 31 can be switched to positions of automatic closing AC, manual closing MC, neutral N, manual opening MO, and automatic opening AO. FIG. 2 illustrates the state in which the manipulation knob 31 is located in the position of neutral N. When the manipulation knob 31 is properly rotated in an a-direction from the position of neutral N to the position of manual closing MC, a manual closing operation for closing the window 101 is performed by a manual operation. When the manipulation knob 31 is further rotated in the a-direction from the position of manual closing MC to the position of automatic closing AC, an automatic closing operation for closing the window 101 is performed by an automatic operation. When the manipulation knob 31 is properly rotated in a b-direction from the position of neutral N to the position of manual opening MO, a manual opening operation for opening the window 101 is performed by the manual operation. When the manipulation knob 31 is further rotated in the b-direction from the position of manual opening MO to the position of automatic opening AO, an automatic opening operation for opening the window 101 is performed by the automatic operation. A spring (not illustrated) is provided in the manipulation knob 31. When the driver releases driver's hand from the rotated manipulation knob 31, the manipulation knob 31 is returned to the position of neutral N by a spring force.

For the manual operation, the operation for closing or opening the window 101 is performed while the manipulation knob 31 is held in the position of manual closing MC or manual opening MO by the driver's hand, and the operation for closing or opening the window 101 is stopped when the driver releases driver's hand from the manipulation knob 31 to return the manipulation knob 31 to the position of neutral N. On the other hand, for the automatic operation, once the manipulation knob 31 is rotated to the position of automatic closing AC or automatic opening AO, the operation for closing or opening the window 101 is continuously performed even if the driver releases driver's hand from the manipulation knob 31 to return the manipulation knob 31 to the position of neutral N.

Figure 4:
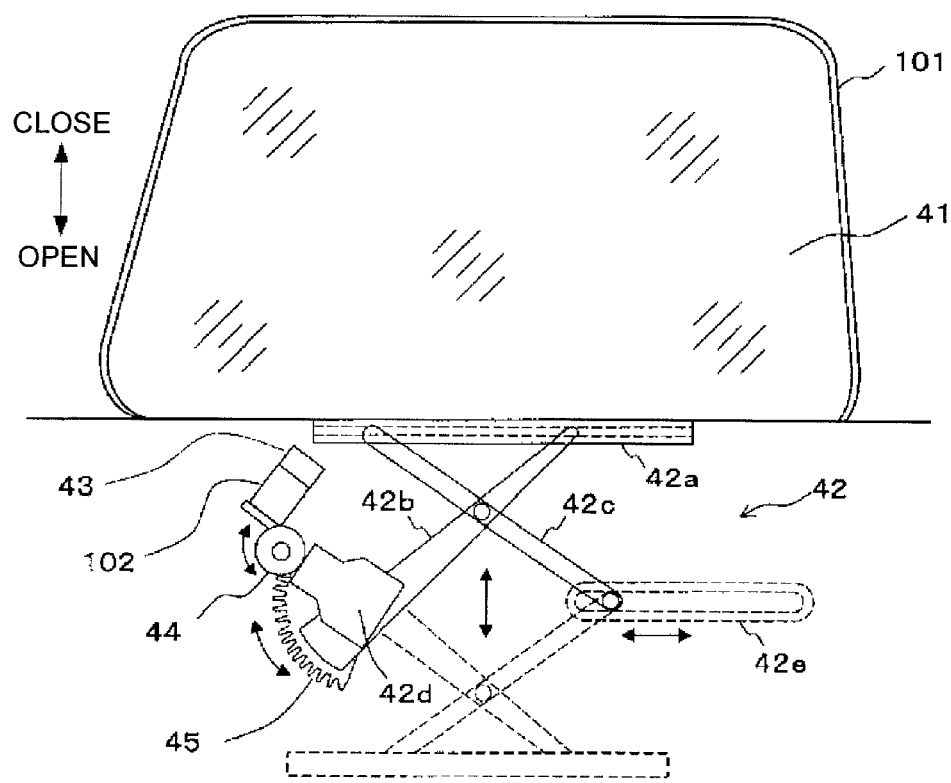
FIG. 4 illustrates a window opening and closing mechanism provided in a window of FIG. 1.

FIG. 4 illustrates an example of a window opening and closing mechanism provided in the window 101. In FIG. 4, reference numeral 41 represents a window glass for opening and closing the window 101 and reference numeral 42 represents a window opening and closing mechanism. The window glass 41 is an example of the "opening and closing body" of the invention. The window opening and closing mechanism 42 is actuated to cause the window glass 41 to perform an elevating and lowering operation, the window 101 is closed by elevating the window glass 41, and the window 101 is opened by lowering the window glass 41. In the window opening and closing mechanism 42, reference numeral 42a represents a support member attached to a lower end of the window glass 41. Reference numeral 42b represents a first arm, one end of which is engaged with the support member 42a and the other end of which is rotatably supported by a bracket 42d. Reference numeral 42c represents a second arm, one end of which is engaged with the support member 42a and the other end of which is engaged with a guide member 42e. The first arm 42b and the second arm 42c are coupled with a shaft interposed therebetween in intermediate portions thereof. Reference numeral 102 represents the above motor and reference numeral 43 represents a rotary encoder. The rotary encoder 43 is coupled to a rotating shaft of the motor 102, and the rotary encoder 43 supplies a pulse according to the rotation of the motor 102. A rotating speed of the motor 102 can be detected by measuring a frequency or a period of the pulse. A rotation amount (moving amount of window glass 41) of the motor 102 can be computed from the output of the rotary encoder 43.

Reference numeral 44 represents a pinion rotated by the motor 102, and reference numeral 45 represents a sectorial gear rotated while engaged with the pinion 44. The gear 45 is fixed to the first arm 42b. The motor 102 can be rotated in the normal and reverse directions, and the motor 102 rotates the pinion 44 and gear 45 by the normal and reverse rotations thereof to normally and reversely turn the first arm 42b. The normal and reverse turns of the first arm 42b are followed by the other end of the second arm 42c, the other end of the second arm 42c is slid in a crosswise direction along a groove of the guide member 42e, and the support member 42a is vertically moved to elevate and lower the window glass 41, thereby opening and closing the window 101.

Figure 5:
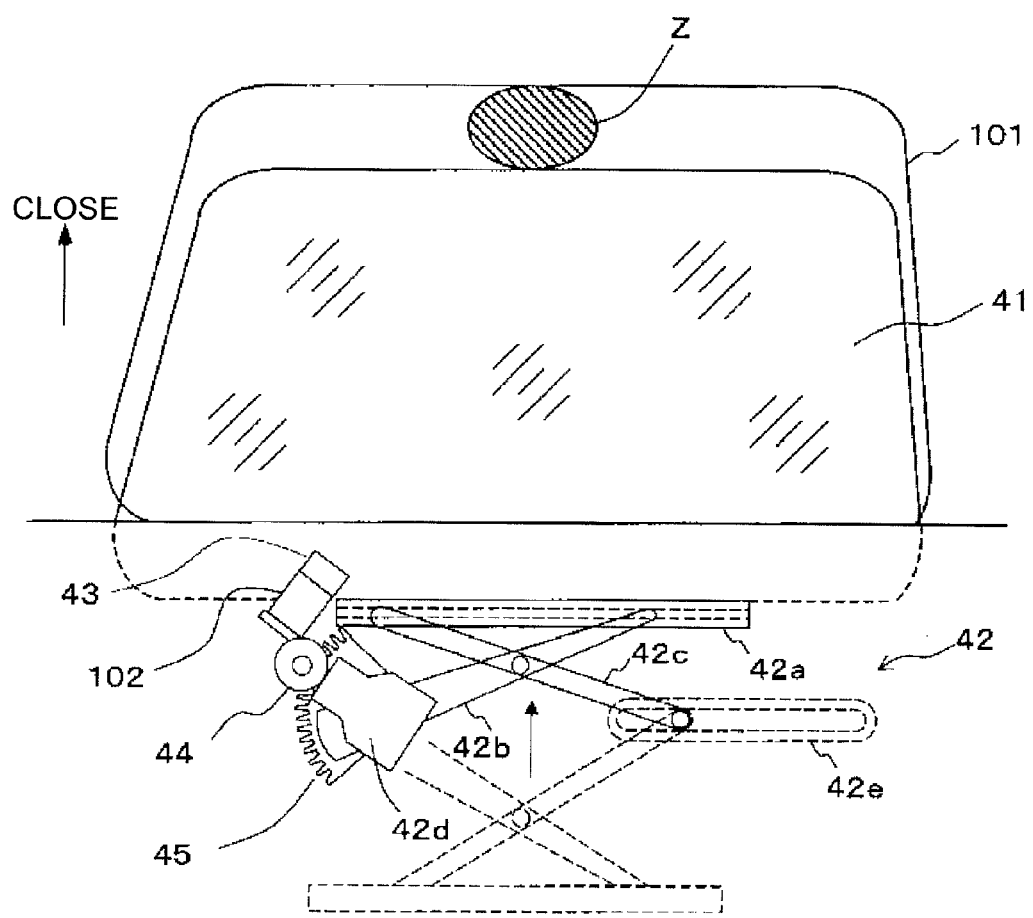
FIG. 5 illustrates the state in which an object is caught in the window of FIG. 1.

The power window device 100 has a function of detecting a catch of an object (foreign substance) when the manual closing operation or the automatic closing operation is performed while the manipulation knob 31 is located in the position of manual closing MC or automatic closing AC of FIG. 2. As illustrated in FIG. 5, when an object (foreign substance) Z is caught in a gap of the window glass 41 while the window 101 is closed, a control unit 10, as described below, (see FIG. 6) detects that the object Z is caught in the window 101, and the control unit 10 switches the operation for closing the window 101 to the opening operation. In detecting the catch, a motor load is computed based on the rotating speed of the motor 102, and the motor load is compared to a threshold to determine whether the object Z is caught in the window 101. The motor load is expressed in terms of, for example, an amount of rotating speed change. When the object Z is caught in the window 101, because the load of the motor 102 is increased to lower the rotating speed, the amount of rotating speed change is increased. The determination that the object Z is caught in the window 101 is made when the amount of rotating speed change exceeds the predetermined threshold. The threshold is previously stored in a storage unit (not illustrated).

Figure 6:
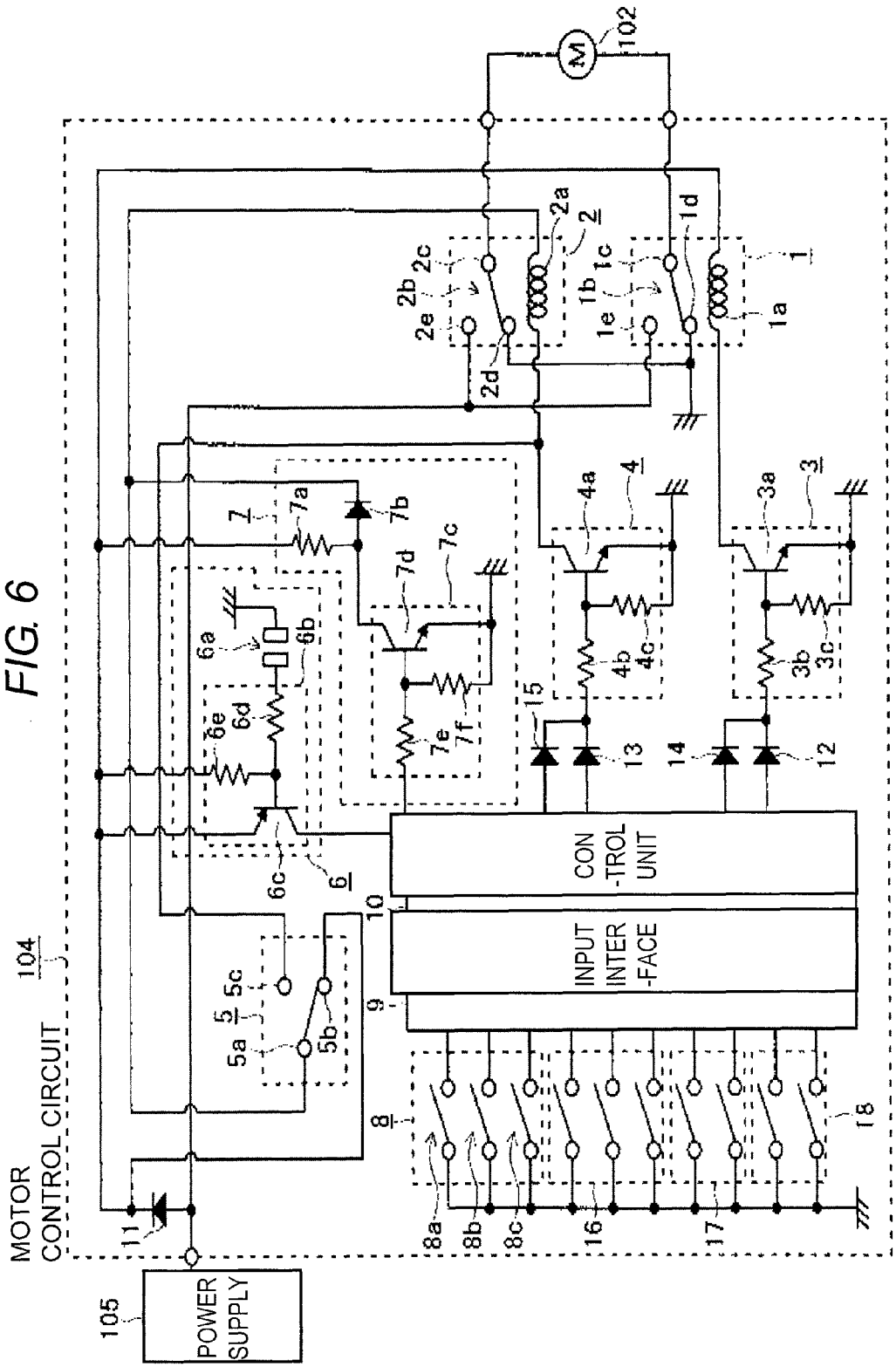
FIG. 6 is a circuit diagram illustrating a motor control circuit of FIG. 1.

FIG. 6 is a circuit diagram illustrating a motor control circuit of FIG. 1. As illustrated in FIG. 6, a motor control circuit 104 includes relay circuits 1 and 2, switch circuits 3 and 4, an anti-submerging measure switch element 5, a detection circuit 6 that detects that a vehicle is submerged, a feed circuit 7, a switch element group 8 that supplies a command received by the manipulation knob 31 (see FIG. 2), an input interface 9, and a control unit 10. The relay circuits 1 and 2 correspond to examples of the "first relay circuit" and "second relay circuit" of the invention, respectively. The switch circuits 3 and 4 correspond to examples of the "first switching circuit" and "second switching circuit" of the invention, respectively.

The relay circuit 1 includes a coil 1a and a relay contact 1b. A current is passed through the coil 1a when the motor 102 is driven in the normal rotation direction. The relay contact 1b connects one of terminals of the motor 102 to the power supply 105 when the current is passed through the coil 1a. The coil 1a corresponds to an example of the "first coil" of the invention, and the relay contact 1b corresponds to an example of the "first relay contact" of the invention.

One end of the coil 1a is connected to the power supply 105 through a diode 11, and the other end is grounded through a switch circuit 3. The diode 11 is provided to prevent an adverse current, a cathode of the diode 11 is connected to one end of the coil 1a, and an anode is connected to the power supply 105. The relay contact 1b includes a common terminal 1c that is connected to one of the terminal of the motor 102, a normally closed terminal 1d that is grounded, and a normally opened terminal 1e that is connected to the power supply 105.

The relay circuit 2 includes a coil 2a and a relay contact 2b. A current is passed through the coil 2a when the motor 102 is driven in the reverse rotation direction. The relay contact 2b connects the other of terminals of the motor 102 to the power supply 105 when the current is passed through the coil 2a. The coil 2a corresponds to an example of the "second coil" of the invention, and the relay contact 2b corresponds to an example of the "second relay contact" of the invention.

One end of the coil 2a is connected to the power supply 105 through the switch element 5 and the diode 11, and the other end is grounded through the switch circuit 4. The relay contact 2b includes a common terminal 2c that is connected to the other terminal of the motor 102, a normally closed terminal 2d that is grounded, and a normally opened terminal 2e that is connected to the power supply 105.

The switch circuit 3 is provided to control whether the current is passed through the coil 1a based on the output of the control unit 10. The switch circuit 3 includes an npn-type transistor 3a, a base resistor 3b that adjusts a base current of the transistor 3a, and a pull-down resistor 3c that connects a base of the transistor 3a to the ground.

In the transistor 3a, a collector is connected to the other end of the coil 1a, and an emitter is grounded. The base of the transistor 3a is grounded through the pull-down resistor 3c while connected to the base resistor 3b. The base resistor 3b is connected to the control unit 10 through a diode 12. The diode 12 is provided to prevent the adverse current, an anode of the diode 12 is connected to the control unit 10, and a cathode is connected to the base resistor 3b.

The switch circuit 4 is provided to control whether the current is passed through the coil 2a based on the output of the control unit 10. The switch circuit 4 includes an npn-type transistor 4a, a base resistor 4b that adjusts a base current of the transistor 4a, and a pull-down resistor 4c that connects a base of the transistor 4a to the ground.

In the transistor 4a, a collector is connected to the other end of the coil 2a, and an emitter is grounded. The base of the transistor 4a is grounded through the pull-down resistor 4c while connected to the base resistor 4b. The base resistor 4b is connected to the control unit 10 through a diode 13. The diode 13 is provided to prevent the adverse current, an anode of the diode 13 is connected to the control unit 10, and a cathode is connected to the base resistor 4b.

The switch element 5 is provided to cut off the electric power for actuating the relay circuit 2 when the manipulation knob 31 (see FIG. 2) is switched to the position of "manual opening MO" or "automatic opening AO". Specifically, the switch element 5 is provided so as to be interlocked with a switch element 8a as described below, and the switch element 5 short-circuits one end of the coil 2a to the other end of the coil 2a when the switch element 8a is turned on. The switch element 5 includes a common terminal 5a that is connected to one end of the coil 2a, a normally closed terminal 5b that is connected to the cathode of the diode 11, and a normally opened terminal 5c that is connected to the other end of the coil 2a. The switch element 5 is provided in the slide switch 33, and the turn-on and turn-off of the switch element 5 are switched while mechanically interlocked with the switch element 8a by the manipulation knob 31 (see FIG. 3).

The detection circuit 6 is provided to pass the currents through the coils 2a and 2b when water leakage is detected in the submerged state. The detection circuit 6 includes a water leakage sensing element 6a and a switch circuit 6b. In the water leakage sensing element 6a, one of electrodes is grounded, and the other electrode is connected to the switch circuit 6b.

The switch circuit 6b includes a pnp-type transistor 6c, a base resistor 6d that adjusts a base current of the transistor 6c, and a pull-up resistor 6e that connects a base of the transistor 6c to the power supply 105 through the diode 11.

In the transistor 6c, an emitter is connected to the power supply 105 through the diode 11. The base of the transistor 6c is connected to the power supply 105 through the pull-up resistor 6e while connected to the base resistor 6d. The base resistor 6d is connected to the other electrode of the water leakage sensing element 6a.

A collector of the transistor 6c is connected to the switch circuit 3 through a diode 14 while connected to the switch circuit 4 through a diode 15. The diode 14 is provided to prevent the adverse current, an anode of the diode 14 is connected to the collector of the transistor 6c, and a cathode is connected to the base resistor 3b. The diode 15 is provided to prevent the adverse current, an anode of the diode 15 is connected to the collector of the transistor 6c, and a cathode is connected to the base resistor 4b.

The feed circuit 7 supplies the electric power for actuating the relay circuit 2 when the detection circuit 6 does not detect that the vehicle is submerged. The feed circuit 7 includes a resistor 7a that prevents the power supply 105 from being directly connected to the ground, an adverse current preventing diode 7b, and a switch circuit 7c.

One end of the resistor 7a is connected to the power supply 105 through the diode 11, and the other end is connected to an anode of the diode 7b. A cathode of the diode 7b is connected to one end of the coil 2a. The switch circuit 7c is connected to a connecting point of the other end of the resistor 7a and the anode of the diode 7b.

The switch circuit 7c is provided to connect the connecting point of the other end of the resistor 7a and the anode of the diode 7b to the ground when the detection circuit 6 detects that the vehicle is submerged. The switch circuit 7c includes an npn-type transistor 7d, a base resistor 7e that adjusts a base current of the transistor 7d, and a pull-down resistor 7f that connects a base of the transistor 7d to the ground.

In the transistor 7d, a collector is connected to the connecting point of the other end of the resistor 7a and the anode of the diode 7b, and an emitter is grounded. The base of the transistor 7d is grounded through the pull-down resistor 7f while connected to the base resistor 7e. The base resistor 7e is connected to the collector of the transistor 6c of the detection circuit 6.

The switch element group 8 includes a switch element 8a that is turned on when a command for opening the window 101 is received, a switch element 8b that is turned off when a command for closing the window 101 is received, and a switch element 8c that is turned on when a command for automatically operating the window 101 is received. The switch elements 8a, 8b, and 8c are provided in the slide switch 33, and the turn-on and turn-off of each of the switch elements 8a, 8b, and 8c is mechanically switched by the manipulation knob 31 (see FIG. 3).

Accordingly, the switch elements 8b and 8c are turned on when the driver switches the manipulation knob 31 (see FIG. 2) to the position of "automatic closing AC". Only the switch element 8b is turned on when the driver switches the manipulation knob 31 to the position of "manual closing MC". Only the switch element 8a is turned on when the driver switches the manipulation knob 31 to the position of "manual opening MO". The switch elements 8a and 8c are turned on when the driver switches the manipulation knob 31 to the position of "automatic opening AO". The outputs of the switch elements 8a to 8c are fed into the control unit 10 through the input interface 9.

When the driver releases the driver's hand from the manipulation knob 31 after switching the manipulation knob 31 to the position except for the position of "neutral N", the manipulation knob 31 is returned to the position of "neutral N". At this point, the manipulation knob 31 is mechanically vibrated. Sometimes the switch element 5 interlocked with the switch element 8a chatters due to the vibration.

Outputs of switch element groups 16 to 18 are also fed into the input interface 9. The switch element group 16 is provided to supply a command received by a manipulation knob (not illustrated) that manipulates a window (not illustrated) of a passenger seat. The switch element group 16 includes a switch element that is turned on when a command for opening the window of the passenger seat is received, a switch element that is turned on when a command for closing the window of the passenger seat is received, and a switch element that is turned on when a command for automatically operating the window of the passenger seat is received. The manipulation switch 103 constituting the switch element group 16 does not have the structure interlocked with the switch element 5 as shown in FIG. 3. The same holds true for the manipulation switches 103 constituting the switch element groups 17 and 18.

The switch element group 17 is provided to supply a command received by a manipulation knob (not illustrated) that manipulates a window of a left rear seat (not illustrated). The switch element group 17 includes a switch element that is turned on when a command for opening the window of the left rear seat is received, and a switch element that is turned on when a command for closing the window of the left rear seat is received.

The switch element group 18 is provided to supply a command received by a manipulation knob (not illustrated) that manipulates a window of a right rear seat (not illustrated). The switch element group 18 includes a switch element that is turned on when a command for opening the window of the right rear seat is received, and a switch element that is turned on when a command for closing the window of the right rear seat is received.

The control unit 10 controls the turn-on and turn-off of the transistor 3a of the switch circuit 3 and the transistor 4a of the switch circuit 4 according to the input from the input interface 9. As illustrated in FIG. 5, the control unit 10 stops the operation for closing the window 101 to open the window 101 when the catch of the object (foreign substance) Z is detected while the window 101 is being closed. Specifically, the control unit 10 controls the transistors 3a and 4a such that the rotating direction of the motor 102 is reversed from the reverse rotation direction to the normal rotation direction. The control unit 10 corresponds to an example of "catch detecting unit" of the invention.

FIGS. 7 to 15 are circuit diagrams for explaining the operation of the motor control circuit in the power window device of the embodiment. An operation of the power window device 100 of the embodiment will be described with reference to FIGS. 7 to 15. In the following description, the presence or absence of the water leakage and the presence or absence of the chatter are classified, and the automatic closing manipulation and automatic opening manipulation of each case will be described.

(No Water Leakage, No Chatter, and Automatic Closing Manipulation)

Figure 7:
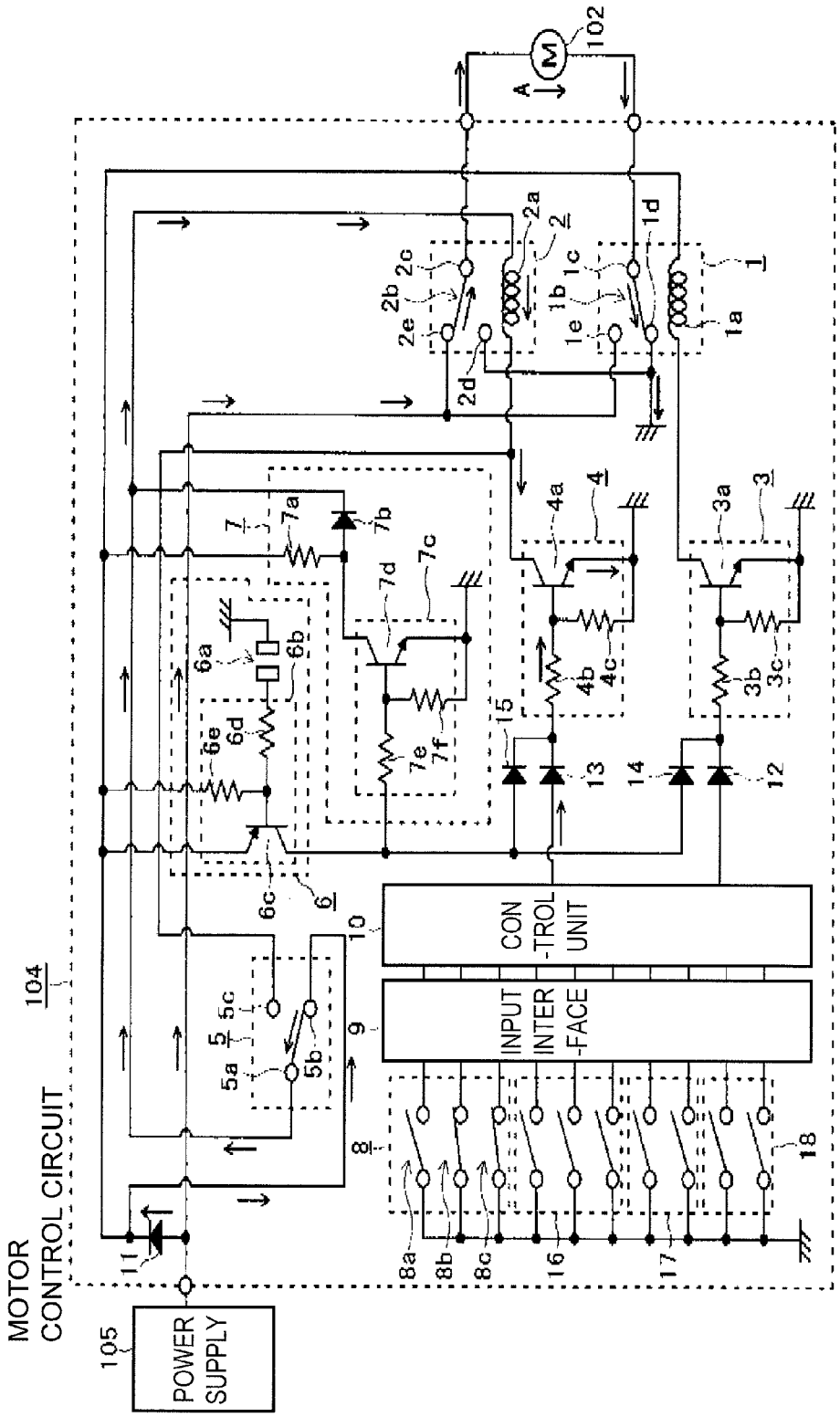
FIG. 7 is a circuit diagram for explaining an automatic closing manipulation of the motor control circuit of FIG. 6 during "no water leakage and no chatter"

As illustrated in FIG. 7, the switch elements 8b and 8c are turned on. Therefore, the control unit 10 applies a voltage to the base of the transistor 4a to turn on the transistor 4a, thereby passing the current from the power supply 105 to the diode 11, the switch element 5, the coil 2a, and the transistor 4a in order. At this point, the current is passed through the coil 2a, and the relay contact 2b is actuated to connect the common terminal 2c and the normally opened terminal 2e, thereby passing the current from the power supply 105 to the relay contact 2b, the motor 102, and the relay contact 1b in order. At this point, the current is passed through the motor 102 in an A-direction to rotate the motor 102 in the reverse rotation direction, whereby the window glass 41 (see FIG. 4) is driven in the closed direction.

(No Water Leakage, No Chatter, and Automatic Opening Manipulation)

Figure 8:
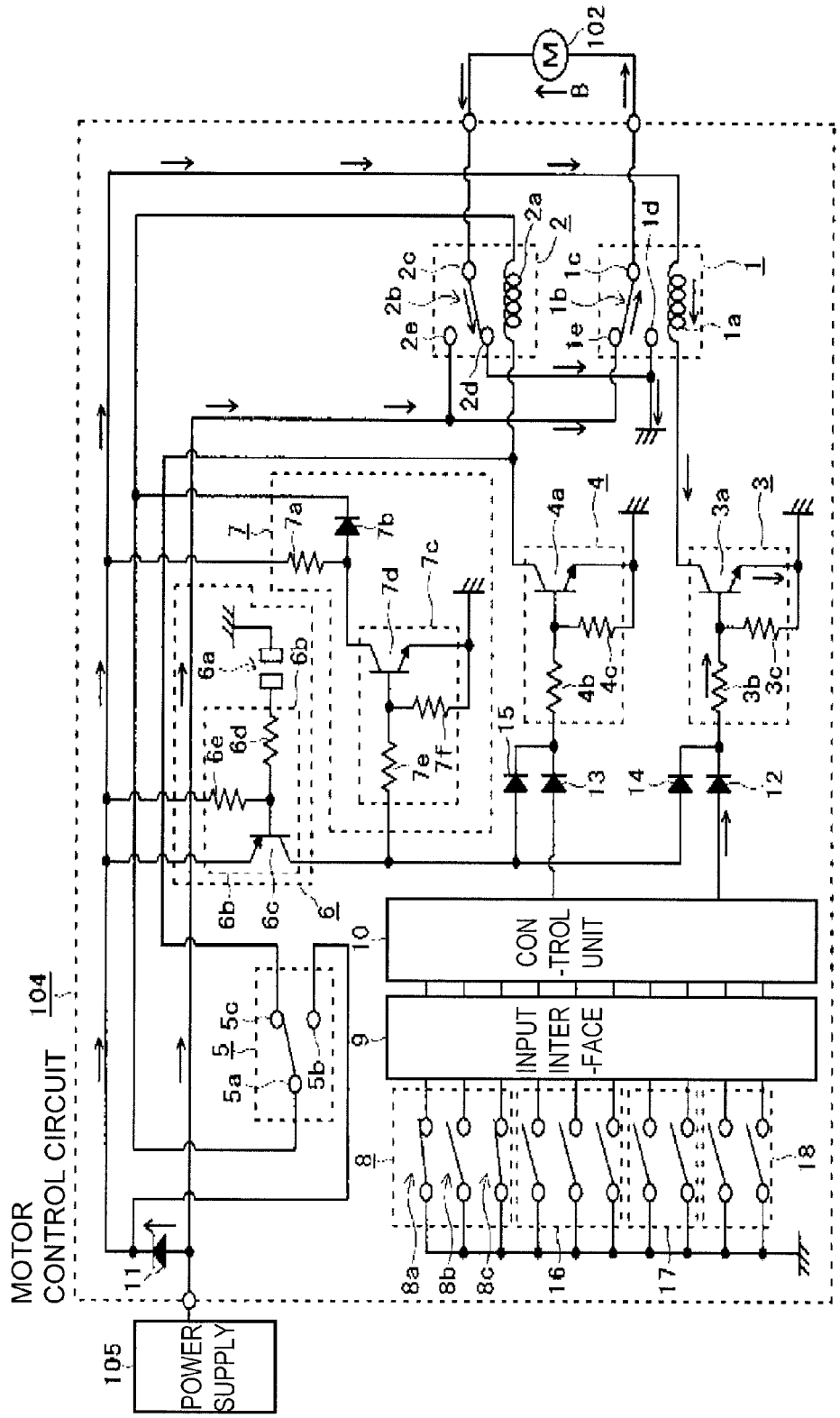
FIG. 8 is a circuit diagram for explaining an automatic opening manipulation of the motor control circuit of FIG. 6 during "no water leakage and no chatter"

As illustrated in FIG. 8, the switch elements 8a and 8c are turned on. At this point, the switch element 5 is interlocked with the switch element 8a to connect the common terminal 5a and the normally opened terminal 5c. The control unit 10 applies the voltage to the base of the transistor 3a to turn on the transistor 3a, thereby passing the current from the power supply 105 to the diode 11, the coil 1a, and the transistor 3a in order. At this point, the current is passed through the coil 1a, and the relay contact 1b is actuated to connect the common terminal 1c and the normally opened terminal 1e, thereby passing the current from the power supply 105 to the relay contact 1b, the motor 102, and the relay contact 2b in order. At this point, the current is passed through the motor 102 in a B-direction to rotate the motor 102 in the normal rotation direction, whereby the window glass 41 (see FIG. 4) is driven in the opened direction.

(No Water Leakage, Chatter, and Automatic Closing Manipulation)

Figure 9:
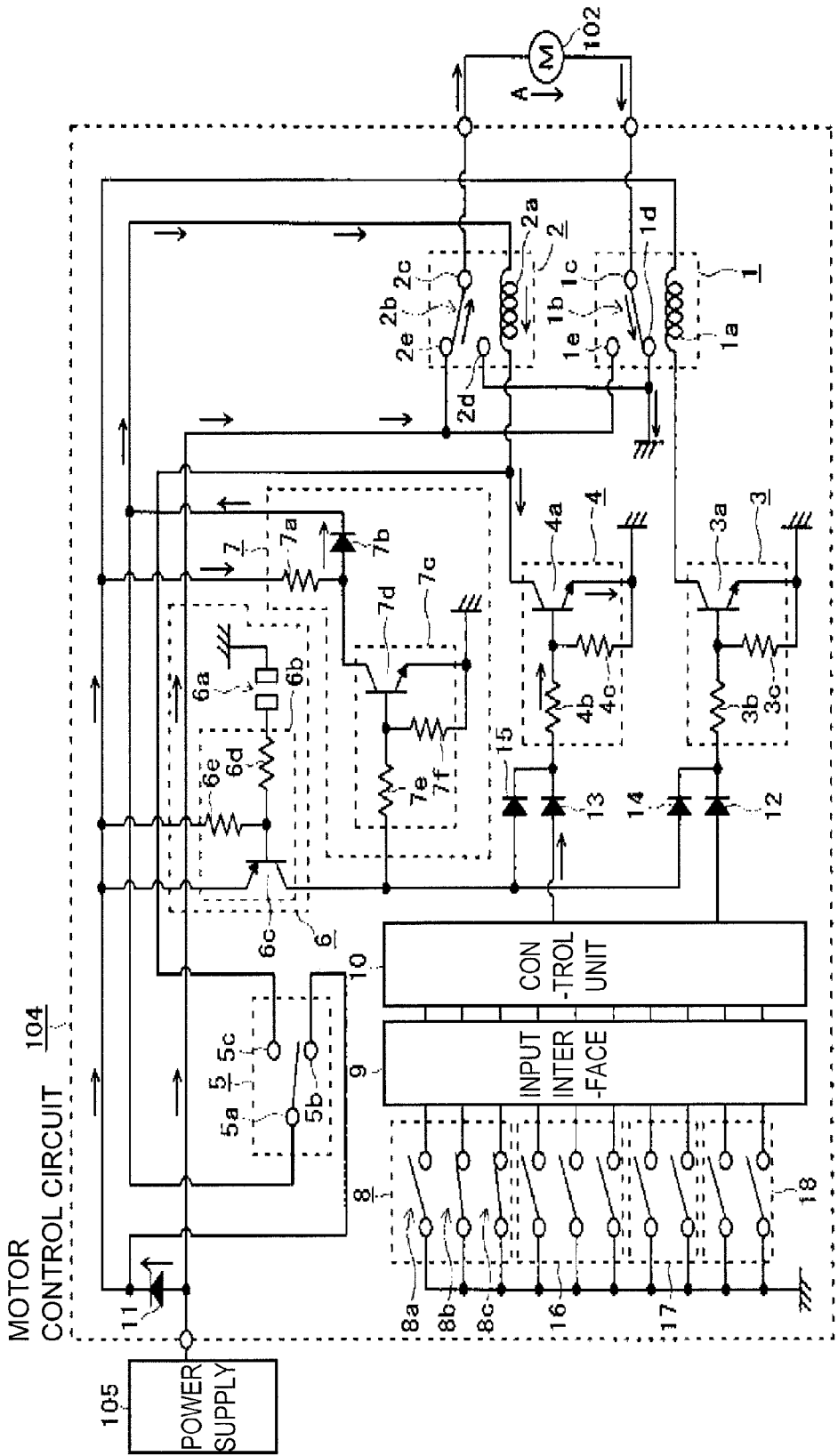
FIG. 9 is a circuit diagram for explaining the automatic closing manipulation of the motor control circuit of FIG. 6 during "no water leakage but chatter"

As illustrated in FIG. 9, the switch elements 8b and 8c are turned on. At this point, the switch element 5 chatters due to the manipulation of the manipulation knob 31 (see FIG. 3), whereby the common terminal 5a is separated from the normally closed terminal 5b and the normally opened terminal 5c. Therefore, the current passed from the power supply 105 to the coil 2a through the switch element 5 is tentatively cut off. However, the control unit 10 applies the voltage to the base of the transistor 4a to turn on the transistor 4a, thereby passing the current from the power supply 105 to the diode 11, the resistor 7a, the diode 7b, the coil 2a, and the transistor 4a in order. That is, the electric power is supplied from the feed circuit 7 to the coil 2a to pass the current through the coil 2a, whereby the relay contact 2b is actuated to connect the common terminal 2c and the normally opened terminal 2e. Therefore, the current is passed from the power supply 105 to the relay contact 2b, the motor 102, and the relay contact 1b in order. At this point, the current is passed through the motor 102 in the A-direction to rotate the motor 102 in the reverse rotation direction, whereby the window glass 41 (see FIG. 4) is driven in the closed direction. Thus, even if the switch element 5 chatters, the feed circuit 7 supplies the electric power in order to actuate the relay circuit 2, so that the motor 102 can continuously be rotated in the reverse rotation direction without tentative interruption to prevent the false catch determination.

(No Water Leakage, Chatter, and Automatic Opening Manipulation)

Figure 10:
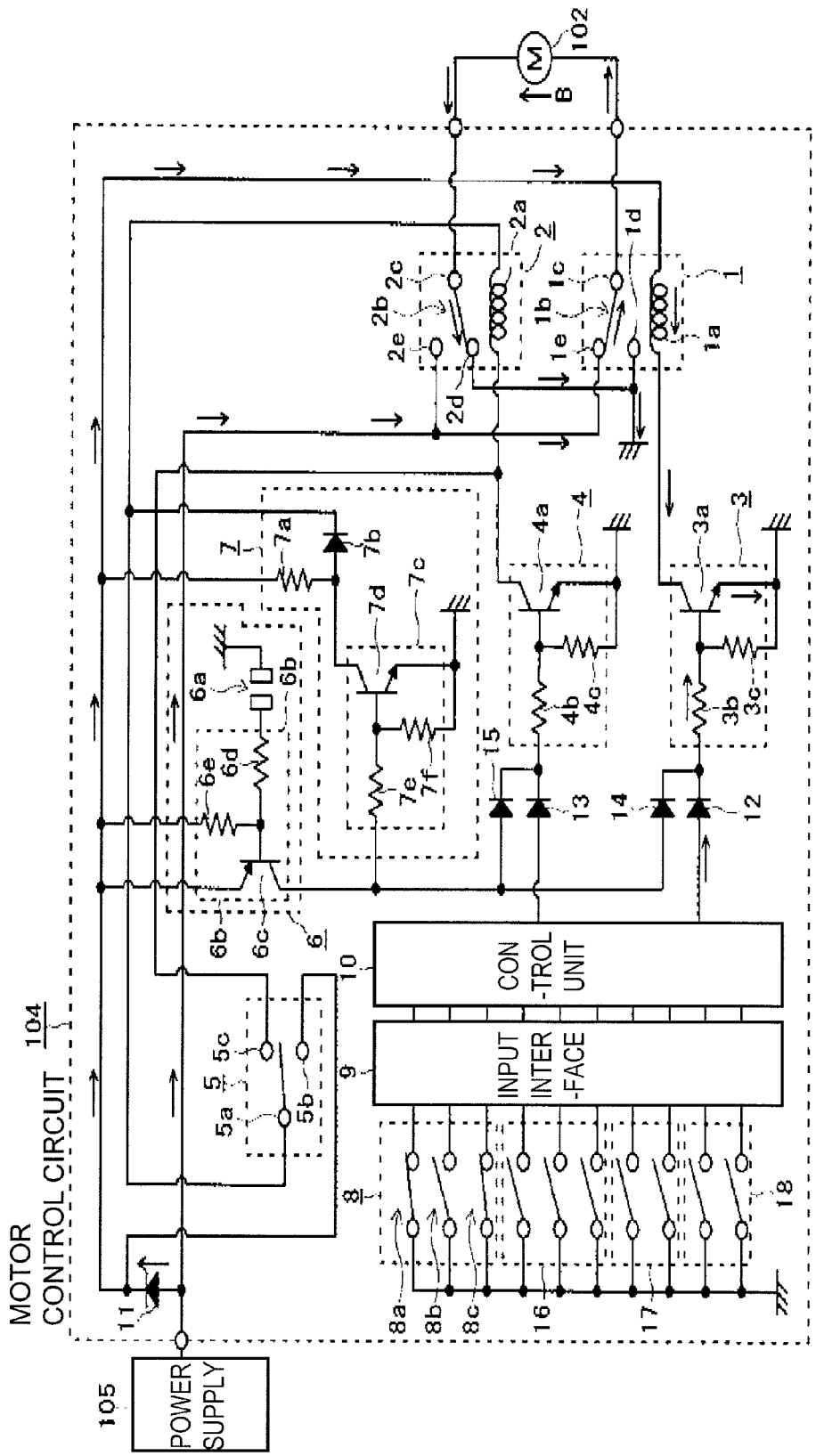
FIG. 10 is a circuit diagram for explaining the automatic opening manipulation of the motor control circuit of FIG. 6 during "no water leakage but chatter"

As illustrated in FIG. 10, the switch elements 8a and 8c are turned on. At this point, the switch element 5 chatters to separate the common terminal 5a from the normally closed terminal 5b and the normally opened terminal 5c. However, the motor control circuit 104 is operated in the same way as that of FIG. 8. The control unit 10 applies the voltage to the base of the transistor 3a to turn on the transistor 3a, thereby passing the current from the power supply 105 to the diode 11, the coil 1a, and the transistor 3a in order. At this point, the current is passed through the coil 1a to actuate the relay contact 1b, thereby connecting the common terminal 1c and the normally opened terminal 1e. Therefore, the current is passed from the power supply 105 to the relay contact 1b, the motor 102, and the relay contact 2b in order. At this point, the current is passed through the motor 102 in the B-direction to rotate the motor 102 in the normal rotation direction, whereby the window glass 41 (see FIG. 4) is driven in the opened direction.

(Water Leakage and Pre-Manipulation)

Figure 11:
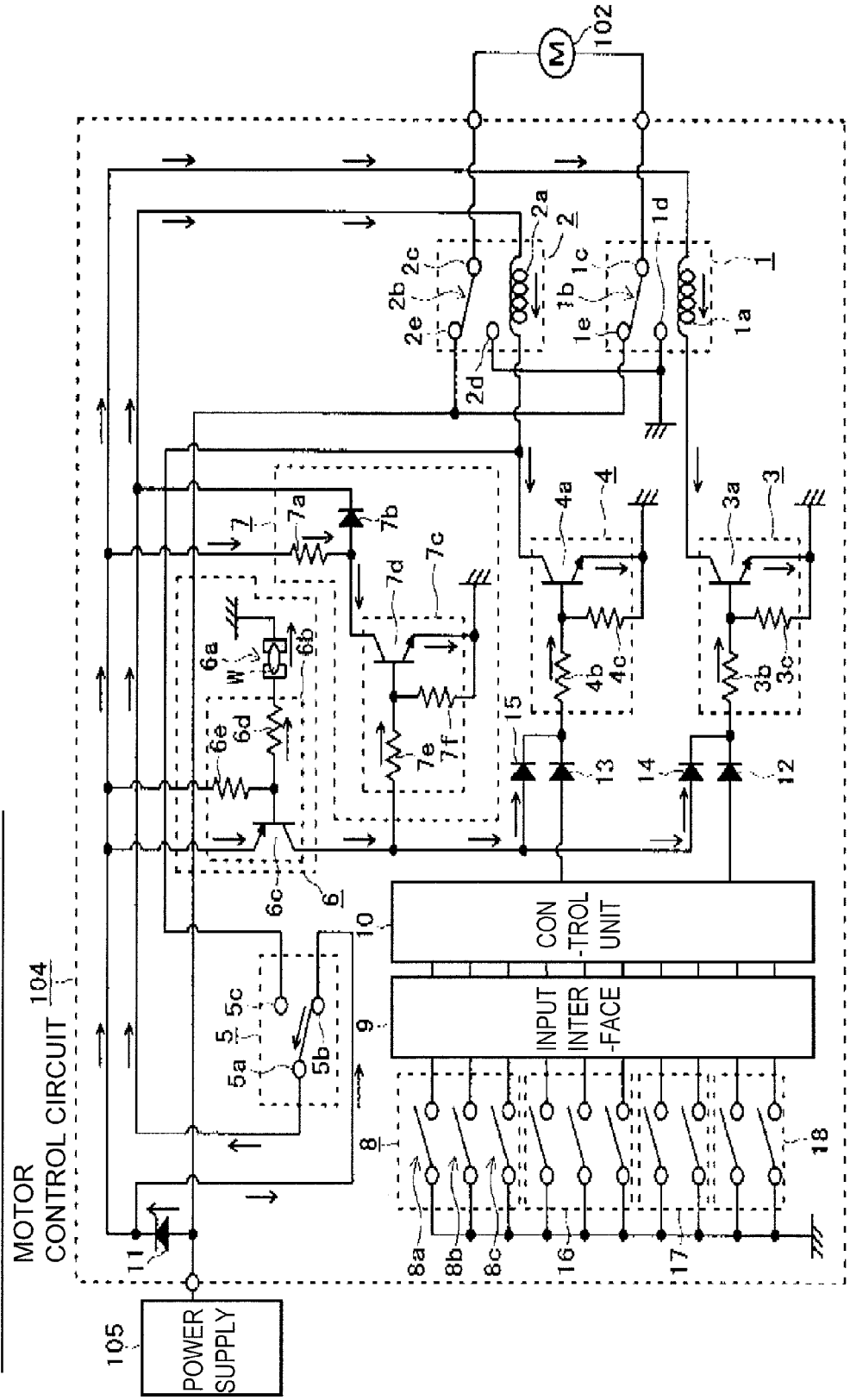
FIG. 11 is a circuit diagram for explaining a pre-manipulation state of the motor control circuit of FIG. 6 during water leakage.

As illustrated in FIG. 11, both the electrodes of the water leakage sensing element 6a are put in the conduction state by water W. Because the voltage applied to the base of the transistor 6c is lowered, the transistor 6c is turned on. Accordingly, the power supply 105 applies the voltage to the bases of the transistors 3a, 4a, and 7d to turn on the transistors 3a, 4a, and 7d.

At this point, the current is passed from the power supply 105 to the diode 11, the switch element 5, the coil 2a, and the transistor 4a in order. Because the current is passed through the coil 2a, the relay contact 2b is actuated to connect the common terminal 2c and the normally opened terminal 2e. The current is passed from the power supply 105 to the diode 11, the coil 1a, and the transistor 3a in order. Because the current is passed through the coil 1a, the relay contact 1b is actuated to connect the common terminal 1c and the normally opened terminal 1e. Therefore, potentials at both ends of the motor 102 are equalized, and the motor 102 is not driven.

The transistor 7d is turned on to pass the current from the power supply 105 to the diode 11, the resistor 7a, and the transistor 7d in order. Therefore, the current is not passed from the feed circuit 7 to the coil 2a.

(Water Leakage, No Chatter, and Automatic Closing Manipulation)

Figure 12:
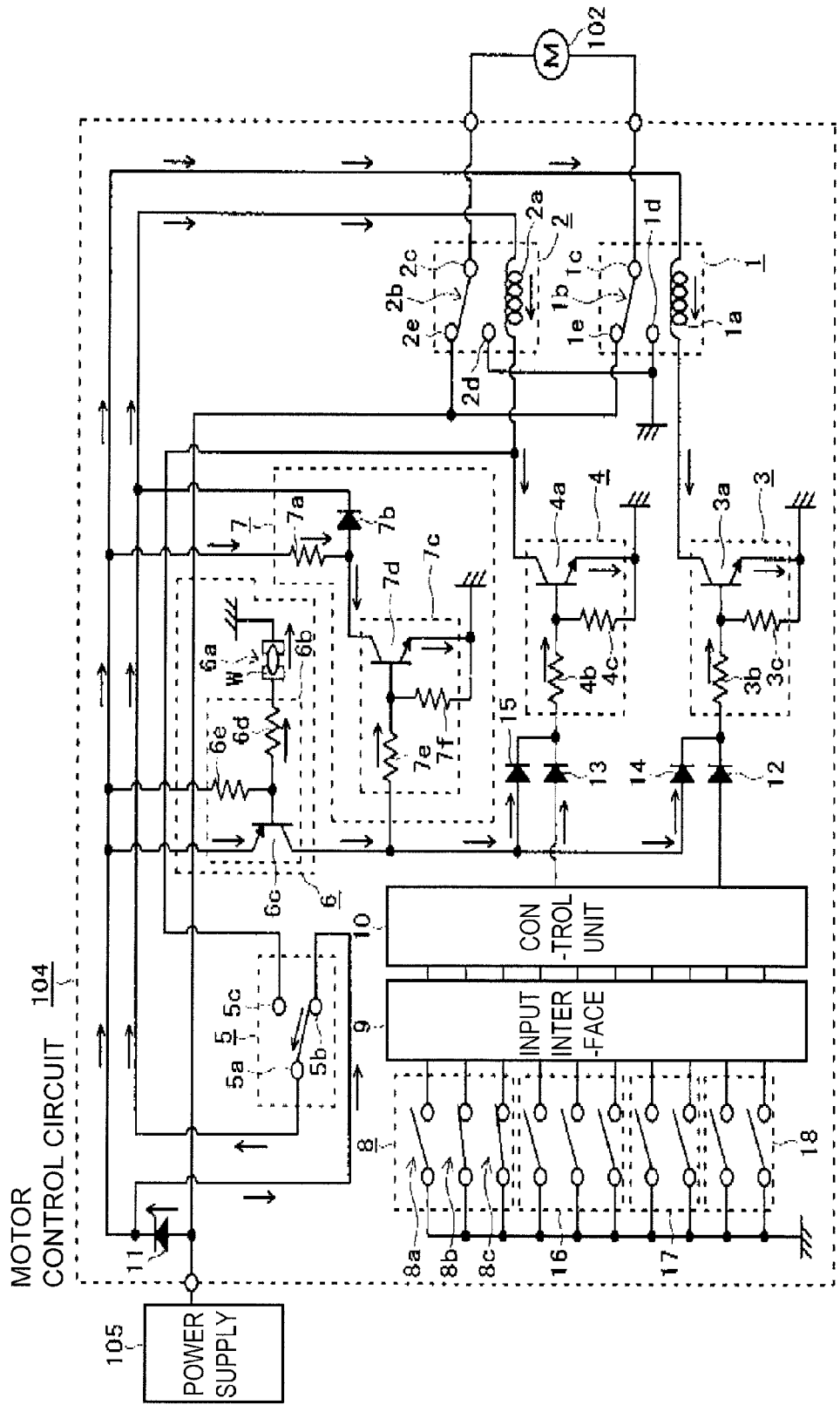
FIG. 12 is a circuit diagram for explaining the automatic closing manipulation of the motor control circuit of FIG. 6 during "water leakage and no chatter"

As illustrated in FIG. 12, the switch elements 8b and 8c are turned on. Therefore, the control unit 10 applies the voltage to the base of the transistor 4a. However, the motor control circuit 104 is not changed from the state of FIG. 11, and the motor 102 is not driven. In such cases, the window 101 is not closed although the closing manipulation is performed. However, even if the window 101 is not closed, there is no problem because the vehicle is submerged unlike the usual state.

(Water Leakage, No Chatter, and Automatic Opening Manipulation)

Figure 13:
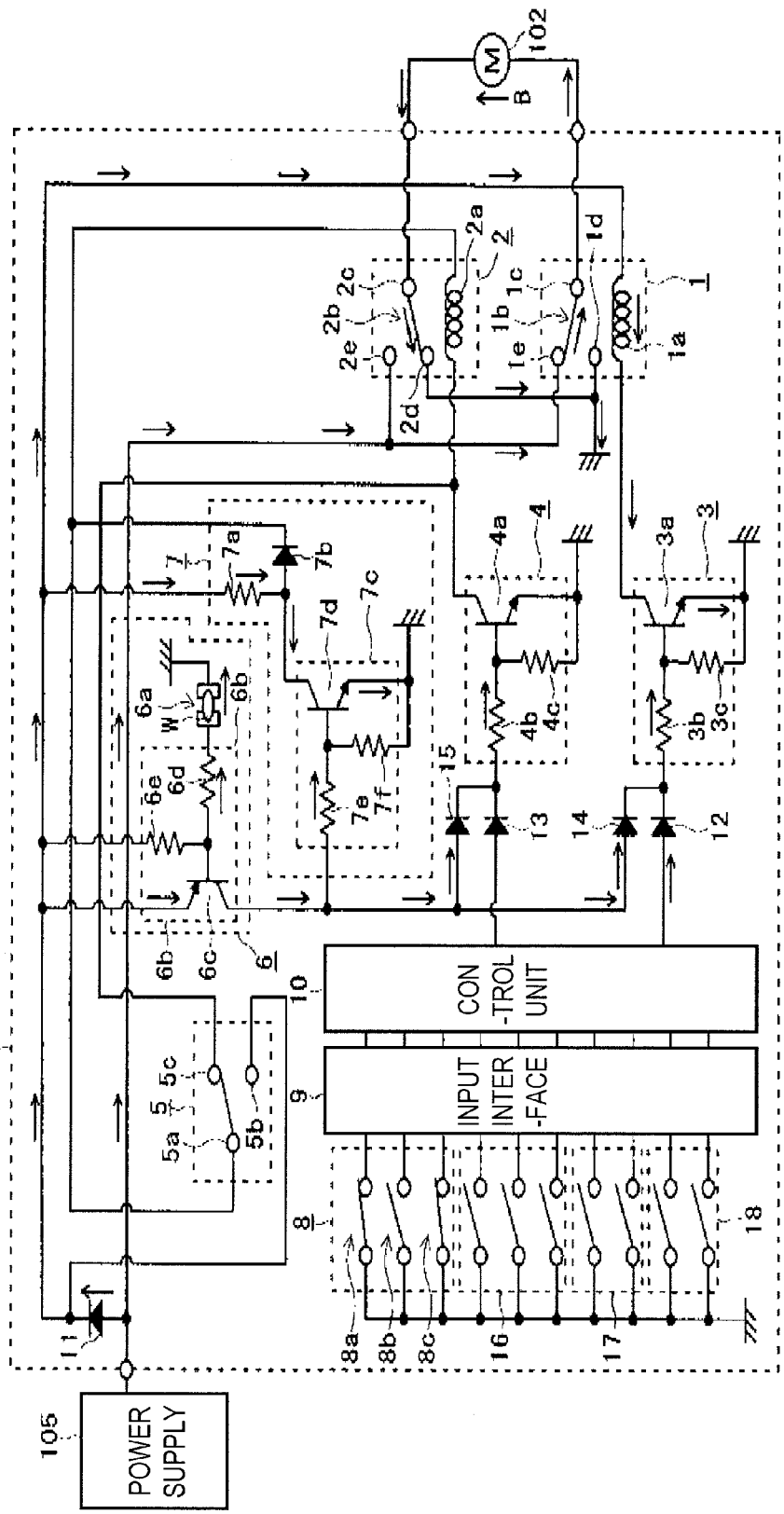
FIG. 13 is a circuit diagram for explaining the automatic opening manipulation of the motor control circuit of FIG. 6 during "water leakage and no chatter"

As illustrated in FIG. 13, switch elements 8a and 8c are turned on. Therefore, the control unit 10 applies the voltage to the base of the transistor 3a. The switch element 5 and the switch element 8a are interlocked with each other to connect the common terminal 5a and the normally opened terminal 5c, and one end of the coil 2a connected to the power supply 105 is connected to the other end of the coil 2a to short-circuit both the ends of the coil 2a, whereby the current is not passed through the coil 2a. Accordingly, the relay contact 2b is not actuated, but the common terminal 2c and the normally closed terminal 2d are connected.

On the other hand, the current is passed from the power supply 105 to the diode 11, the coil 1a, and the transistor 3a in order. Because the current is passed through the coil 1a, the relay contact 1b is actuated to connect the common terminal 1c and the normally opened terminal 1e. Therefore, the current is passed from the power supply 105 to the relay contact 1b, the motor 102, and the relay contact 2b in order. At this point, the current is passed through the motor 102 in the B-direction to rotate the motor 102 in the normal rotation direction, whereby the window glass 41 (see FIG. 4) is driven in the opened direction.

(Water Leakage, Chatter, and Automatic Closing Manipulation)

Figure 14:
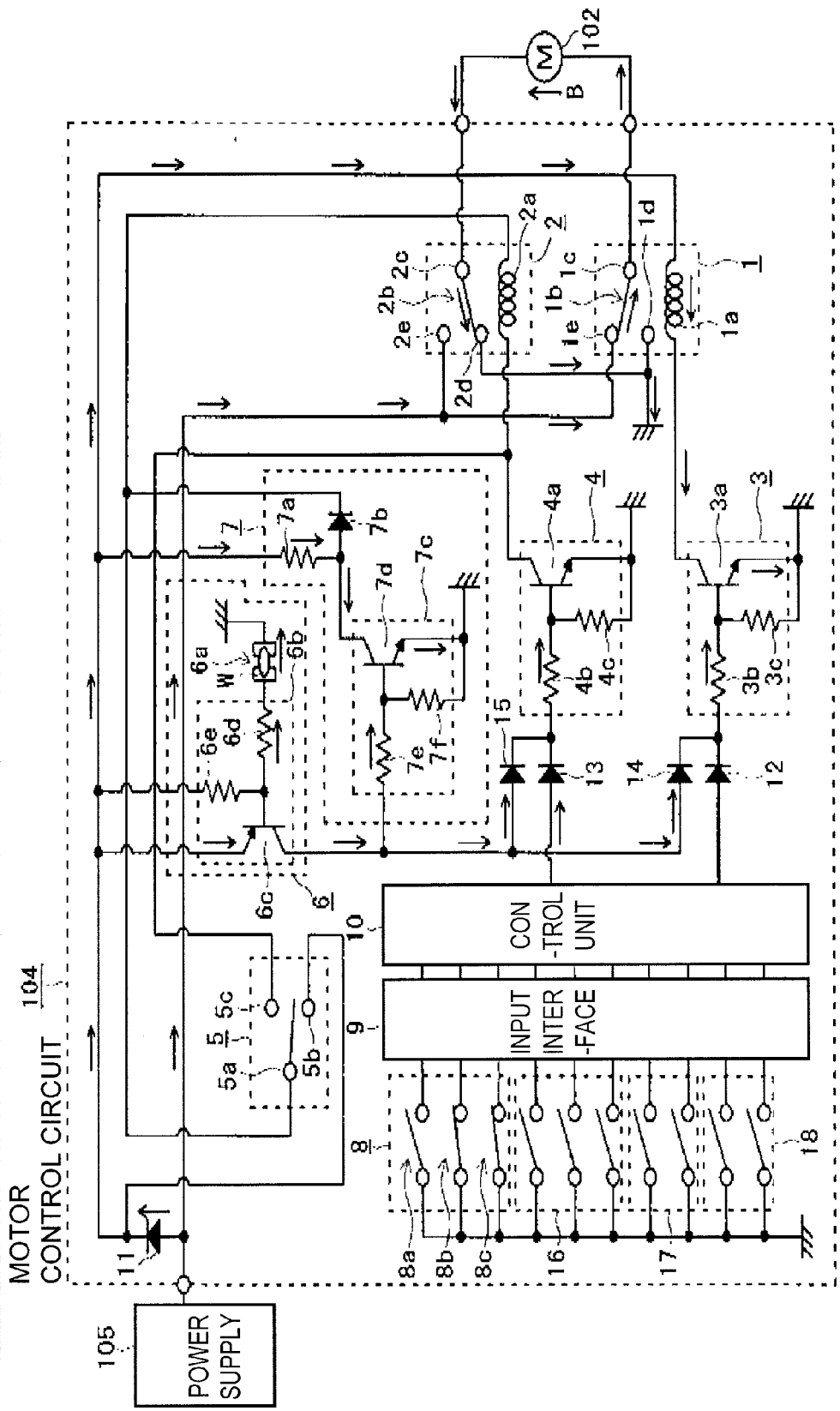
FIG. 14 is a circuit diagram for explaining the automatic closing manipulation of the motor control circuit of FIG. 6 during "water leakage and chatter"

As illustrated in FIG. 14, the switch elements 8b and 8c are turned on. Therefore, the control unit 10 applies the voltage to the base of the transistor 4a. At this point, the switch element 5 chatters to separate the common terminal 5a from the normally closed terminal 5b and the normally opened terminal 5c. Because the power supply 105 and one end of the coil 2a are disconnected, the current is not passed through the coil 2a. Accordingly, the relay contact 2b is not actuated, but the common terminal 2c and the normally closed terminal 2d are connected.

On the other hand, the current is passed from the power supply 105 to the diode 11, the coil 1a, and the transistor 3a in order. Because the current is passed through the coil 1a, the relay contact 1b is actuated to connect the common terminal 1c and the normally opened terminal 1e. Therefore, the current is passed from the power supply 105 to the relay contact 1b, the motor 102, and the relay contact 2b in order. At this point, the current is passed through the motor 102 in the B-direction to rotate the motor 102 in the normal rotation direction, whereby the window glass 41 (see FIG. 4) is driven in the opened direction. In such cases, the window 101 is opened although the closing manipulation is performed. However, even if the window 101 is opened, there is no problem because the vehicle is submerged unlike the usual state.

(Water Leakage, Chatter, and Automatic Opening Manipulation)

Figure 15:
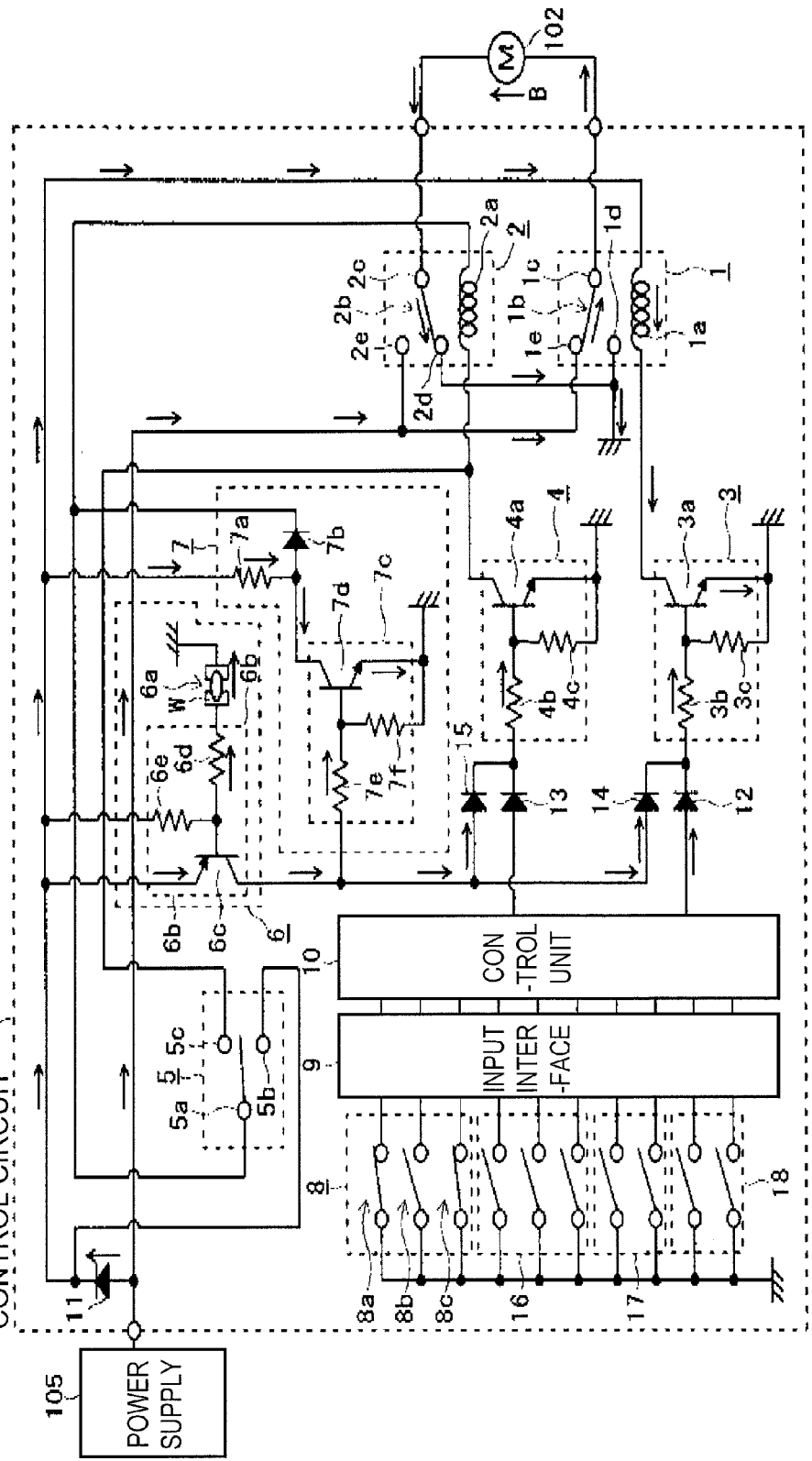
FIG. 15 is a circuit diagram for explaining the automatic opening manipulation of the motor control circuit of FIG. 6 during "water leakage and chatter".

As illustrated in FIG. 15, switch elements 8a and 8c are turned on. Therefore, the control unit 10 applies the voltage to the base of the transistor 3a. At this point, the switch element 5 chatters to separate the common terminal 5a from the normally closed terminal 5b and the normally opened terminal 5c. The subsequent operations of the motor control circuit 104 are identical to those of FIG. 14. That is, because the power supply 105 and one end of the coil 2a are disconnected, the current is not passed through the coil 2a. Accordingly, the relay contact 2b is not actuated, but the common terminal 2c and the normally closed terminal 2d are connected.

On the other hand, the current is passed from the power supply 105 to the diode 11, the coil 1a, and the transistor 3a in order. Because the current is passed through the coil 1a, the relay contact 1b is actuated to connect the common terminal 1c and the normally opened terminal 1e. Therefore, the current is passed from the power supply 105 to the relay contact 1b, the motor 102, and the relay contact 2b in order. At this point, the current is passed through the motor 102 in the B-direction to rotate the motor 102 in the normal rotation direction, whereby the window glass 41 (see FIG. 4) is driven in the opened direction.

In the embodiment, as described in FIG. 9, the feed circuit 7 is provided, and the feed circuit 7 can pass the current through the coil 2a even if the switch element 5 chatters due to the automatic closing manipulation during no water leakage, whereby the motor 102 can continuously be rotated in the reverse rotation direction. Therefore, the tentative interruption of the rotation of the motor 102, caused by the chatter, can be prevented, and the control unit 10 can be prevented from making the false determination that the catch is generated even if the switch element 5 chatters. That is, the trouble that the motor 102 is normally rotated to open the window 101 is not generated.

In the embodiment, the switch element 5 is provided, so that both the ends of the coil 2a can be short-circuited when the switch element 8a is turned on in the automatic opening manipulation. Therefore, the trouble that the window 101 is opened in the water leakage can be prevented (see FIG. 13).

In the embodiment, because the switch circuit 7c is provided in the feed circuit 7, the current is not passed from the feed circuit 7 to the coil 2a in the water leakage. Therefore, the window 101 can be opened in the water leakage when the switch element 5 chatters while the automatic opening manipulation is performed (see FIG. 15).

Various modifications of the invention can be made in addition to the embodiment. For example, in the embodiment, the invention is applied to the power window device 100 provided in the vehicle driving seat. Alternatively, the invention may be applied to the power window device provided in the passenger seat or rear seat of the vehicle.

In the embodiment, the switch elements 5 and 8a are mechanically interlocked by the manipulation knob 31. Alternatively, the on state and off state of the switch element 8a may be fed into the control unit 10, and the control unit 10 may control the turn-on and turn-off of the switch element 5 based on the input result, thereby electrically interlocking the switch elements 5 and 8a.

In the embodiment, the control unit 10 detects that the object is caught in the window. Alternatively, a catch detecting unit (not illustrated) may be provided instead of the control unit 10.

What is claimed is:

1. A motor control circuit comprising:
    a manipulation unit;
    a control unit that drives a motor in a normal rotation direction or a reverse rotation direction according to a normal rotation command or a reverse rotation command, the normal rotation command or the reverse rotation command being fed from the manipulation unit, the control unit driving an opening and closing body in a opened direction or a closed direction by driving the motor in the normal rotation direction or the reverse rotation direction;
    a catch detecting unit that detects a foreign substance caught in the opening and closing body when the opening and closing body is driven in the closed direction, the control unit stopping the drive of the motor in the reverse rotation direction by receiving an output from the catch detecting unit when the foreign substance is caught in the opening and closing body;
    a first relay circuit that connects one of terminals of the motor to a power supply when the motor is driven in the normal rotation direction;
    a second relay circuit that connects the other terminal of the motor to the power supply when the motor is driven in the reverse rotation direction;
    a switch element that cuts off connection to the power supply when the normal rotation command is fed into the control unit from the manipulation unit, the power supply actuating the second relay circuit;
    a detection circuit that prevents the drive of the motor in the reverse rotation direction when detected that a vehicle is submerged; and
    a feed circuit that puts the power supply and the second relay circuit in a conduction state when the switch element cuts off the connection to the power supply, the power supply actuating the second relay circuit, when the motor is driven in the reverse rotation direction while the detection circuit does not detect that the vehicle is submerged.

2. The motor control circuit according to claim 1, wherein the first relay circuit comprises:
    a first coil through which a current is passed when the motor is driven in the normal rotation direction; and
    a first relay contact that connects one of the terminals of the motor to the power supply when the current is passed through the first coil,
    the second relay circuit comprises:
    a second coil through which a current is passed when the motor is driven in the reverse rotation direction; and
    a second relay contact that connects the other terminal of the motor to the power supply when the current is passed through the second coil, and
    the switch element short-circuits one end of the second coil to the other end of the second coil when the normal rotation command is fed from the manipulation unit.

3. The motor control circuit according to claim 2, wherein the feed circuit comprises:
    a resistor that is connected to the power supply;
    a diode that is connected between the resistor and one end of the second coil; and
    a transistor that grounds a connecting point of the resistor and the diode when the detection circuit detects that the vehicle is submerged.

4. The motor control circuit according to claim 2, further comprising:
    a first switching circuit that switches whether the current is passed through the first coil; and
    a second switching circuit that switches whether the current is passed through the second coil,
    wherein the first switching circuit and the second switching circuit switch whether the currents are passed through the first coil and the second coil under the control of the control unit when the detection circuit does not detect that the vehicle is submerged, and
    the detection circuit connects the power supply to the first switching circuit and the second switching circuit, and the first switching circuit and the second switching circuit pass the currents through the first coil and the second coil, when the detection circuit detects that the vehicle is submerged.

5. A power window device comprising:
    an opening and closing body that is provided in a window;
    a motor that drives the opening and closing body;
    a power supply that supplies an electric power to the motor; and
    a motor control circuit according to claim 1.

6. The motor control circuit according to claim 3, further comprising:
    a first switching circuit that switches whether the current is passed through the first coil; and
    a second switching circuit that switches whether the current is passed through the second coil,
    wherein the first switching circuit and the second switching circuit switch whether the currents are passed through the first coil and the second coil under the control of the control unit when the detection circuit does not detect that the vehicle is submerged, and
    the detection circuit connects the power supply to the first switching circuit and the second switching circuit, and the first switching circuit and the second switching circuit pass the currents through the first coil and the second coil, when the detection circuit detects that the vehicle is submerged.

7. A power window device comprising:
an opening and closing body that is provided in a window;
a motor that drives the opening and closing body;
a power supply that supplies an electric power to the motor; and
a motor control circuit according to claim 2.

8. A power window device comprising:
an opening and closing body that is provided in a window;
a motor that drives the opening and closing body;
a power supply that supplies an electric power to the motor; and
a motor control circuit according to claim 3.

9. A power window device comprising:
an opening and closing body that is provided in a window;
a motor that drives the opening and closing body;
a power supply that supplies an electric power to the motor; and
a motor control circuit according to claim 4.

10. A power window device comprising:
an opening and closing body that is provided in a window;
a motor that drives the opening and closing body;
a power supply that supplies an electric power to the motor; and
a motor control circuit according to claim 6.

* * * * *